United States Patent [19]
Schwenk

[11] 3,752,247
[45] Aug. 14, 1973

[54] ARRANGEMENT OF A DRIVING MEANS IN THE FRONT PORTION OF A VEHICLE, SUCH AS A MOTOR VEHICLE

[75] Inventor: Kurt Schwenk, Wolfsburg, Germany

[73] Assignee: Volkswagenwerk Aktiengesellschaft, Wolfsburg, Germany

[22] Filed: Nov. 8, 1971

[21] Appl. No.: 196,419

[30] Foreign Application Priority Data
Nov. 14, 1970 Germany.................. P 20 56 102.8

[52] U.S. Cl. .............................. 180/64 R, 180/91
[51] Int. Cl. ............................................. B60k 5/12
[58] Field of Search .................. 180/82 R, 91, 64 R, 180/64 L, 1 R; 296/35 R, 65 A

[56] References Cited
UNITED STATES PATENTS
3,638,748  2/1972  Tixier................................ 180/64 R FOREIGN PATENTS OR APPLICATIONS
525,027  4/1955  Italy.................................. 180/64 R Primary Examiner—Robert G. Sheridan
Assistant Examiner—George F. Abraham
Attorney—Ernest F. Marmorek

[57] ABSTRACT

In a motor vehicle having a motor block secured to the chassis in a front portion of the vehicle, means projecting along the direction of travelling associated with the motor block and arranged above the center of gravity of the motor block, the arrangement of the projecting means and the securing members being such that during an impact having a certain force magnitude effecting the projecting means causes the motor block to rotate with its end facing the passenger cabin of the vehicle downwardly towards the road by creating a rotational momentum pivoting the block downwardly.

14 Claims, 3 Drawing Figures

Patented Aug. 14, 1973  3,752,247

ARRANGEMENT OF A DRIVING MEANS IN THE FRONT PORTION OF A VEHICLE, SUCH AS A MOTOR VEHICLE

FIELD OF THE INVENTION

The present invention relates to an arrangement of a driving means, such as an engine, and its securing arrangement in the front part of a vehicle, such as a motor vehicle.

BACKGROUND OF THE INVENTION

The existing US safety regulations require that a motor vehicle under certain circumstances should be able to withstand a collision with an object without thereby exposing its passengers to substantial injury. For this purpose at present the front part of the vehicle is constructed as a so-called collapsing zone. As a result, a large portion of the energy of impact is converted into work required to deform the collapsing zone. This deforming effect is produced exclusively by the portion of the vehicle which is in front of the passenger cabin so that the passenger cabin remains practically undamaged. The collapsing zone can be relatively easily manufactured since it can be made from an easily deformable sheet metal. The situation becomes however different when within the collapsible zone relatively a rigid and heavy member should be accommodated, such as, the motor or the driving block of a vehicle. Such members which are not susceptible to deformation become, during an impact, without contributing to the deforming effect, pushed backward and penetrate the separating wall of the passenger cabin very easily representing thereby a considerable source of injuries for the passengers. In order to eliminate this source of injuries or danger the front portion or front carriage of the vehicle must be correspondingly enlarged in order to offset the impact energy before the driving means could come in contact with a barrier. This solution is, however, very cumbersome in that it represents a disadvantageous effect on the magnitude of the radius of turning and also shows its effect on the styling of the vehicle which in most cases appears to represent also certain disadvantages.

SUMMARY OF THE INVENTION

It is an object of the present invention to provide an improved arrangement and suspension for the driving means of the vehicle without major material expenditure and without making any substantial changes in the vehicle appearance and which fully meets the safety requirements.

According to the present invention the driving means of a vehicle has associated therewith means projecting along the direction of the travelling in a region above its center of gravity and the driving means is suspended or secured by securing means dimensioned and distributed in such a manner that during an impact having a certain magnitude effecting the projecting means, the forces affecting the projecting means are translated into a rotational momentum tending to pivot the driving means with its end facing the passenger cabin downwardly towards the road.

The forwardly projecting means may constitute part of the driving means itself, such as in the form of nose-shaped castings on the engine housing; they can also constitute part of the chassis such as in the form of a reinforced part of the hood latch carrying cross-beam lying on the level of the cylinder head. It is within the scope of the present invention that the projecting means can be part of the suspension or securing means of the engine.

According to another feature of the present invention all securing means of the driving means with the exception of one lying below the horizontal plane passing through the center of gravity of the driving means are provided with built-in weak points. These securing means then during an impact will break away and the driving means can rotate with its end facing the passenger cabin downwardly without thereby damaging the separating wall of the passenger cabin or the floor of the vehicle.

BRIEF DESCRIPTION OF THE DRAWING

The invention will become more readily apparent from the following description of a preferred embodiment thereof shown, by way of example, in the accompanying drawing, in which.

DESCRIPTION OF THE PREFERRED EMBODIMENT

Figure 1:
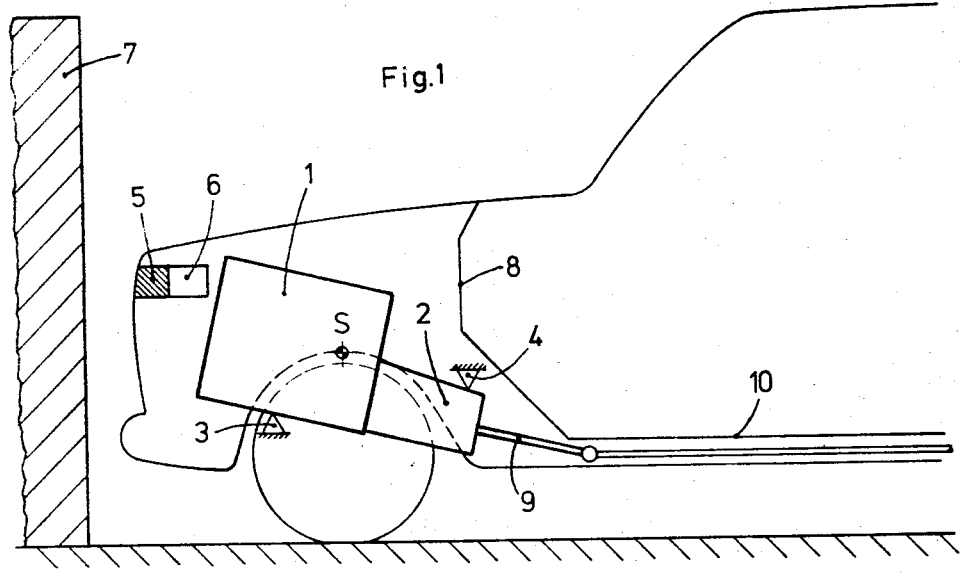
FIG. 1 is a schematic illustration of the arrangement of the driving means in the front portion of a motor vehicle according to the present invention.
Figure 2:
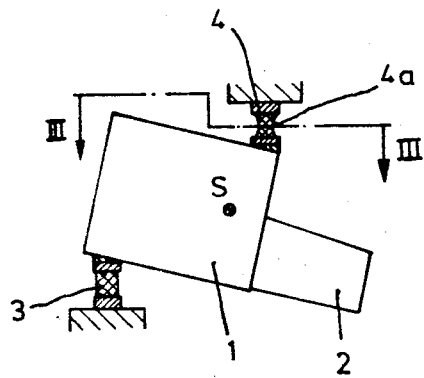
FIG. 2 is a schematic illustration of the driving means according to FIG. 1 in which, however, the back securing means lie above the center of gravity of the driving means.
Figure 3:
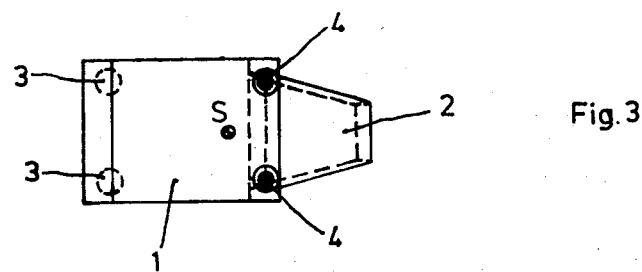
FIG. 3 is a view of the driving means-transmission arrangement according to FIG. 2, viewed in the direction of the arrow, III—III in FIG. 2.

With reference to FIGS. 1–3 it is seen that the driving means including a motor or engine block 1 and a transmission block 2 is suspended or mounted on rubber-metal blocks 3 and 4 in the front portion of the motor vehicle. On the front wall of the chassis a crossbeam 5 is provided in front of the engine 1 and which has the function of stiffening the chassis and to accommodate a latching means for the hood of the engine space. On the cross beam 5 at the level of the upper edge of the motor 1 there is a reinforcement 6 provided which, in this illustrated embodiment serves as the projecting means projecting along the line of travel. As stated above, however, such projecting means can be in the form of a nose-shaped casting provided on the front portion of the motor 1 which functions also similarly in case of an impact as the reinforcement 6 and as hereinafter described more particularly.

In the event the vehicle collides with an object such as the illustrated concrete wall 7 then the driving means 1 with its front upper edge will come in contact with the reinforcement 6 before a force could affect the front lower edge of the driving means 1 and which could push the driving means through the separating wall 8 into the passenger space. The impact of the motor 1 onto the reinforcement 6 produces a momentum about the center of gravity S lying much lower, whereupon after the back suspending means 4 of the driving means breaks away due to a built-in weak portion 4a, the driving means with its extension 9 lying behind the transmission block 2 undergoes a rotation downwardly. As a result, the separating wall 8 and also the floor of the vehicle 10 remain undamaged.

With reference to FIGS. 2 and 3, it can be seen that a part of the securing means 4 can, according to the present invention, lie above the center of gravity S of the engine-transmission gear combination 1 and 2 and, that the securing means 3 and 4 are formed as a plurality of securing means as can be seen more clearly in FIG. 3. Each of the securing means 4, which are the back securing means and, which lie above the center of the gravity S, has a built-in weak point 4a in it which facilitates the breaking away of the driving means aggregate comprising the engine block 1 and the transmission gear housing 2 at such weak points 4a from the vehicle when a force of predetermined magnitude effects the projecting means 6. The securing means 3 which are below the plane passing through the center of gravity S are of the non-breaking-away type securing means.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a vehicle, a driving means, means for pivotally securing said driving means to said vehicle on a pivot in a front portion thereof, restraining means on opposite sides of the pivot to normally prevent rotation of the driving means, means projecting along the line of travelling associated with said driving means and arranged above the center of gravity of said driving means, the arrangement of said projecting means being such that during an impact having a certain force magnitude effecting said projecting means causes said driving means to rotate with its end facing the passenger cabin of the vehicle downwardly towards the road by creating a rotational momentum.

2. The combination as claimed in claim 1, wherein said driving means includes said projecting means.

3. The combination as claimed in claim 1, wherein the chassis includes said projecting means.

4. The combination as claimed in claim 1, wherein said securing means includes said projecting means.

5. The combination as claimed in claim 1, wherein said securing means includes a plurality of securing members distributed above and below a horizontal plane passing through the center of gravity of said driving means.

6. The combination as claimed in claim 5, wherein said securing members above said plane include built-in weak points for breaking away said driving means at such members from said vehicle when a force of predetermined magnitude affects said projecting means.

7. The combination as claimed in claim 6, wherein at least one of said securing members below said plane is fixed to said vehicle in a non-breaking-away fashion so as to withstand an impacting force of predetermined magnitude affecting said projecting means.

8. In a motor vehicle, a driving block including a combustion engine and a transmission block, means for pivotally securing said driving block to said motor vehicle on a pivot in a front portion thereof, restraining means on opposite sides of the pivot to normally prevent rotational movement of the block, means projecting along the line of travelling associated with said driving block and arragned above the center of gravity of said driving block, the arrangement of said projecting means being such that during an impact having a certain force magnitude effecting said projecting means causes said driving block to rotate with its end facing the passenger cabin of the vehicle downwardly towards the road by creating a rotational momentum.

9. The combination as claimed in claim 8, wherein said driving block includes said projecting means.

10. The combination as claimed in claim 8, wherein the chassis includes said projecting means.

11. The combination as claimed in claim 8, wherein said securing means includes said projecting means.

12. The combination as claimed in claim 8, wherein said securing means includes a plurality of securing members distributed above and below a horizontal plane passing through the center of gravity of said driving means.

13. The combination as claimed in claim 12, wherein said securing members above said plane comprise built-in weak points for breaking away said driving means at such members from said vehicle when a force of predetermined magnitude affects said projecting means.

14. The combination as claimed in claim 13, wherein at least one of said securing members below said plane is fixed to said vehicle in a non-breaking-away fashion so as to withstand an impacting force of predetermined magnitude affecting said projecting means.

* * * * *